(No Model.)
G. L. BADGER.
MACHINE FOR WORKING STONE.
No. 594,588. Patented Nov. 30, 1897.
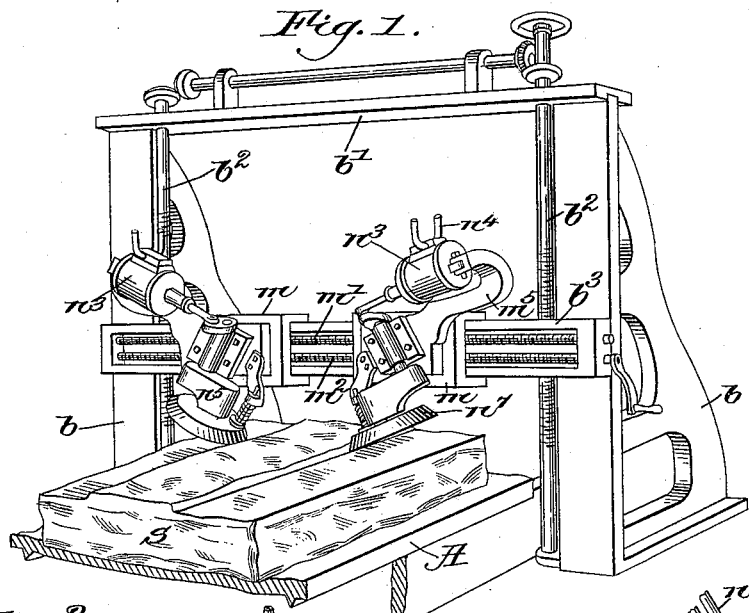
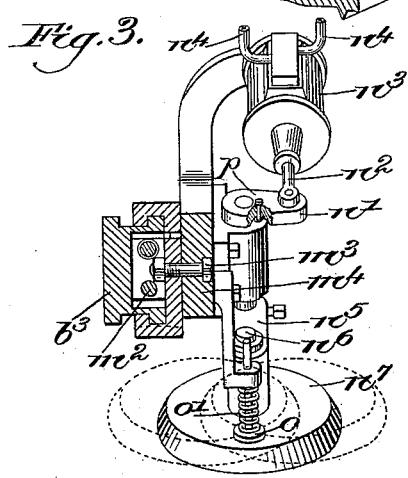
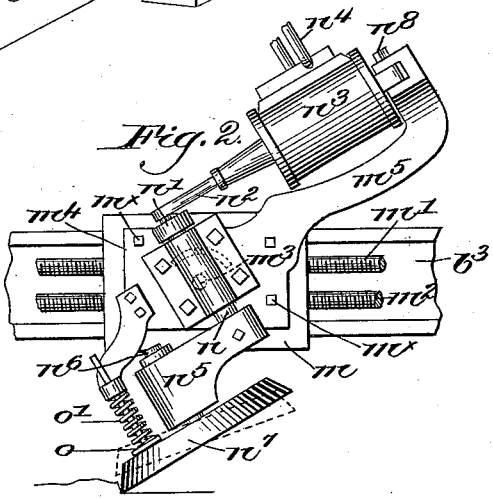
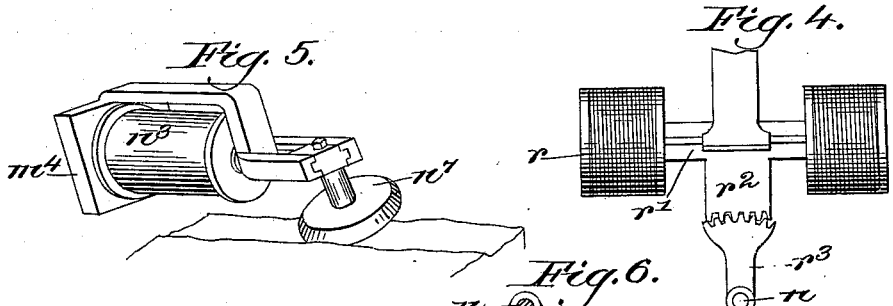
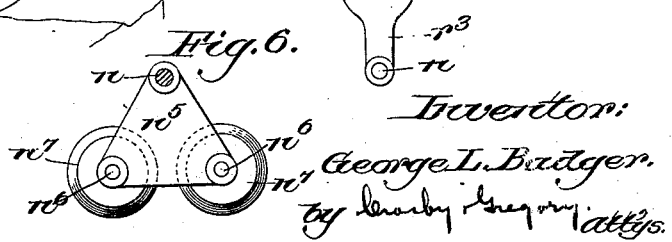
Witnesses:
A. C. Harmon.
Thomas J. Drummond
Inventor:
George L. Badger.
by Crosby Gregory attys.

UNITED STATES PATENT OFFICE.

GEORGE L. BADGER, OF QUINCY, MASSACHUSETTS.

MACHINE FOR WORKING STONE.

SPECIFICATION forming part of Letters Patent No. 594,588, dated November 30, 1897.

Application filed January 21, 1896. Serial No. 576,285. (No model.)

*To all whom it may concern:*

Be it known that I, GEORGE L. BADGER, of Quincy, county of Norfolk, State of Massachusetts, have invented an Improvement in Machines for Working Stone, of which the following description, in connection with the accompanying drawings, is a specification, like letters on the drawings representing like parts.

This invention relates to machines for working stone of that class wherein one or more tools are loosely mounted upon a carrier, to which is imparted such movement as will cause the tool or tools mounted thereon to deliver in rapid succession sharp blows upon a stone surface calculated to work the latter down to a finished surface or face. In another application filed by me September 20, 1895, Serial No. 563,155, I have shown and described a machine of this class wherein a plurality of tools are loosely mounted upon a rotating carrier designed on rotation to revolve the tools and cause the same to deliver the necessary blows upon the stone surface. In machines of this class it is desirable to use tools or cutters of large diameter in order that provision may be had for grinding when dull and few in number in order that they may be quickly exchanged for sharp cutters when dulled.

In machines where the tools are revolved by a rotating carrier, as in my said application, I have found that under certain conditions the number of blows which it is possible to deliver in a given period of time is limited or restricted by the necessity of limiting the high speed with which the tools strike the stone, thereby dulling them quickly.

To overcome this limitation, my present invention comprehends the mounting of the tool upon a vibrating carrier instead of a rotating carrier, as in my previous application referred to, and by employing a small or short vibrating movement or throw of this carrier I am enabled to deliver the blows with great rapidity, yet the tool travels at a comparatively low speed.

In the drawings, Figure 1, in perspective, shows a sufficient portion of a machine embodying my invention to enable the same to be understood; Fig. 2, an enlarged detail showing in elevation the tool, its carrier, and means for actuating the same, said figure also showing the relative position of the tool, when in use, to the stone; Fig. 3, a perspective detail showing the working parts of Fig. 2; Fig. 4, a view illustrating a means for operating the tool by electricity, and Figs. 5 and 6 views illustrating different embodiments of my invention.

In the embodiment of my invention selected for illustration herein and shown in the drawings, $b\ b$ designate the side frames of the apparatus, shown as connected at the top by a cross member $b'$, and upon these side frames is arranged the cross-head $b^3$, adapted to be vertically adjusted by means of the threaded shafts or screws $b^2\ b^2$.

A represents the body or movable work-support upon which the block S of stone to be worked is placed, suitable mechanism being provided to reciprocate this work-support between the side frames $b\ b$.

The above parts may be arranged and operated substantially as shown in my said application, Serial No. 563,155, like letters representing like parts, although the said parts may be otherwise constructed and operated, if desired.

Referring particularly to Fig. 2, upon the cross-head $b^3$ is mounted to slide horizontally across the work-support one or more heads $m$, herein shown as two in number, and adapted to be moved along said cross-head by the feed-screws $m'\ m^2$, one for each head, said screws being rotated either automatically or by hand, as desired.

The heads and the tools and carriers for the same being similar, I will confine my description to one only, and, referring to Figs. 2 and 3, upon the head $m$ I have in the present instance pivoted at $m^3$ a swivel-head $m^4$, provided with a suitable bearing in which is journaled the shaft $n$, shown as provided at its upper end with a crank $n'$, the crank-pin of which is connected, preferably directly, with the piston-rod $n^2$, extending to the operating-cylinder $n^3$ and provided within said cylinder with a suitable piston adapted to be reciprocated in usual manner by a fluid under pressure—such as compressed air, steam, gas, or the like—conducted to the said cylinder through one or more conducting-pipes $n^4$. The stroke of the piston within its cylinder is less than the full stroke of the crank $n'$, so that said piston acts simply to vibrate the crank and rock the shaft $n$, to which it is connected, instead of rotating the same. To the lower end of the shaft $n$ is fixed the carrier $n^5$, shown as a crank-arm, to which is loosely connected, as by a pivot $n^6$, the tool $n^7$, shown as and preferably in the form of a disk, having a beveled edge, as shown in Fig. 2, although my invention is not limited to the particular shape or formation of this tool, as any shape or construction of tool adapted for the desired work may be employed.

Referring to Fig. 2, it will be seen that the cylinder $n^3$ is swiveled at $n^8$ in the end of an arm $m^5$ on the swivel-head $m^4$, so that by turning the said swiveled head upon its pivot and relatively to the main head $m$ the angularity of the tool with relation to the stone surface may be varied as desired.

The operation of the apparatus is as follows: Fluid under pressure—such, for instance, as steam—admitted to the valve-chest of the cylinder $n^3$ will cause rapid reciprocation of the piston within said cylinder, said piston acting, through its piston-rod $n^2$, the crank $n'$, and shaft $n$, to vibrate the carrier $n^5$ to cause the tool $n^7$ to travel rapidly back and forth in the arc of a circle about the axis of the shaft $n$, causing the said tool to deliver in rapid succession blows upon and to remove the stone to a finished surface, the stone and tool being given also a relative movement to cause the blows to be delivered in a substantially straight line therein by the travel of the work-support beneath the head $m$.

By my invention the carrier need not be vibrated through a distance exceeding one inch for a relatively large tool, thus greatly reducing the speed with which the tool strikes the stone surface and greatly prolonging the life of the tool, although my invention is not limited to any particular limit or stroke of the tool-carrier or to any size of tool.

Exceedingly practical results have been obtained by a vibration not exceeding one quarter of an inch at a speed of three thousand three hundred vibrations per minute, the work being done solely by the blow and not by the rolling pressure succeeding the blow, so that it is requisite merely that the blows shall be properly delivered, the general swinging movement of the tool and carrier being relatively immaterial.

By employing two heads and tools, as shown in Fig. 1, and feeding the same gradually toward each other, both can operate simultaneously in working the stone from the edges toward the middle, thereby economizing in time.

I have herein shown a retarding device $o$, pressed against the face of the tool by a spring $o'$ and which acts to stop or check rotation of the tool about its own axis when the tool leaves the stone surface, and by reason of the relative vibrations of the carrier to this retarding or friction device the latter operates to assist in rotating the tool about its axis in the direction in which it will be rotated by contact with the stone surface, thereby assisting in preventing any drag of the tool edge along the stone surface.

It is evident that any drag of the tool upon the stone surface would tend to dull the tool, and it is to prevent this drag that the tool is loosely mounted upon the carrier in order that it may turn or move by reason of its contact with the stone surface. I have found, however, that sometimes under certain conditions the mere contact of the tool with the stone surface is not sufficient to set the tool in motion about its axis to prevent drag, and in such instances a retarding or equivalent device, such as herein described, is of value.

In working irregular surfaces or delicate edges it is sometimes desirable to temporarily hold the carrier against movement, leaving the tool free to travel in contact with the stone surface without the blows, and for accomplishing this I have herein provided a locking device $p$, which when set up against the carrier-bearing holds the former fixedly against movement. The machine is thus enabled rapidly to dress a stone along its surface up to a delicate edge or bead, and then upon turning the electric switch or steam cut-off and throwing in the locking device the delicate bead may be safely dressed without a blow, which latter might chip off the bead, and then, the bead being passed, the blows may be continued again, all being done rapidly and continuously.

To vary the angle of the plane in which the carrier travels, I have provided the swivel-head $m^4$ with one or more clamping-screws $m^\times$, by which said head may be clamped in desired position relatively to the head $m$, the axial shaft $n$ or pivot about which the tool-carrier swings being herein shown as oblique to the stone surface, although it may be in any direction desired or required.

In Fig. 4 I have shown an electric device in the form of a usual solenoid $r$, the armature $r'$ of which is connected with and to vibrate the carrier-shaft herein through the medium of rack $r^2$ on the armature and a segment $r^3$ on the shaft $n$.

In Fig. 5 I have shown a cylinder $n^3$ as standing directly out from the swiveled head $m^4$, the piston-rod protruding from the said cylinder being connected with a head $n'^\times$, arranged to slide in the direction of movement of the piston in fixed guides on the frame which holds the cylinder, the cutter or tool $n^7$ being loosely or rotatably mounted upon a stud carried by said head $n'^\times$. In this instance the cutter or tool is vibrated in a straight line instead of in the arc of a circle, as in the previous constructions, but it nevertheless operates to deliver a succession of blows upon the stone surface, since the latter is given a relative feeding movement to the cutter or tool in a line substantially parallel with the direction in which the tool travels, so that at each forward movement of the tool it strikes a part of the stone surface and delivers a blow to chip off a portion. These are merely instances showing the adaptability of my invention and the various means which may be employed for vibrating the tool-carrier, whether in a straight or a curved line.

In Fig. 6 I have shown the carrier as provided with a plurality of tools arranged edge to edge on the same carrier.

My invention is not limited to the particular embodiment herein shown, for it is evident the same may be varied without departing from the spirit and scope of my invention.

I claim—

1. In a machine for working stone, a work-support for the stone, a vibrating carrier, a tool yieldingly mounted thereupon, arranged to deliver a succession of blows in a straight line in the direction of said vibration, means to vibrate said carrier, and feeding mechanism to impart a relative feeding movement to said support and carrier, in line with the direction in which the impacts of said blows are delivered, substantially as described.

2. In a machine for working stone, a pivotally-mounted carrier, and means to reciprocally vibrate the same about its said pivot for dressing the stone, combined with one or more tools loosely mounted upon and to be vibrated by said carrier, said tools striking the stone in a rapid succession of short sharp blows, the dressing of the stone resulting solely from said blows, substantially as described.

3. In a machine for working stone, a pivotally-mounted carrier, and means to rapidly vibrate the same about its said pivot for dressing the stone, combined with a tool pivoted to and to be vibrated by said carrier, to strike a progressive series of rapid blows in the direction of said vibration, said tool having also a rotative movement about its own pivot, substantially as described.

4. In a machine for working stone, a vibrating carrier, a tool loosely mounted upon and to be vibrated by said carrier, and a retarding device to move said tool on said carrier as the tool is vibrated past said device, said tool being vibrated adjacent to and to be engaged by said retarding device, substantially as described.

5. In a machine for working stone, a carrier, a support in which the same is mounted to vibrate at an acute angle with the stone surface, and one or more tools loosely mounted upon the said carrier and means to rapidly vibrate said tools with a progressive movement relatively to the stone thereby to deliver a succession of blows following close upon each other across the stone upon the said stone surface, substantially as described.

6. In a machine for working stone, a vibrating carrier, one or more tools mounted thereupon, means to impart to the tools short, rapid vibrations in a progressive series relatively to the stone, thereby to deliver a succession of blows upon the stone surface, a support for the said carrier, and means for varying the position of the axis of said carrier on and with relation to its said support to vary the angle at which the blows are delivered by the tool upon the stone surface, substantially as described.

7. In a machine for working stone, a vibrating mounted carrier, a support for the same, one or more tools yieldingly mounted on said carrier, a cylinder and its piston connected with and to vibrate said carrier, substantially as described.

8. In a machine for working stone, a head, a carrier-shaft journaled therein, a carrier at one end of said shaft, and one or more tools yieldingly mounted on said carrier, a crank at the opposite end of said shaft, and a cylinder having its piston connected with and to vibrate said crank and its connected carrier, substantially as described.

9. In a machine for working stone, a work-support, a movable head arranged to travel across said work-support, and provided with a tool-carrier, and one or more tools mounted loosely thereupon to yield as they strike the stone, combined with a motor mounted upon and movable with said head and connected with and to operate said tool-carrier in a direction transverse to said travel, substantially as described.

10. In a stone-dressing machine, the combination with a cylinder and a piston reciprocated therein, of a tool-carrier, a tool freely rotatable therein, said tool having a smooth beveled edge, and connections between said piston and said carrier to vibrate the latter, said tool being free to turn in contact with the stone, substantially as described.

11. In a machine for working stone, a vibrating carrier, and one or more tools mounted thereon, a support for said carrier, means to vibrate the carrier, and means to lock the same against vibration, and a work-support, substantially as described.

12. In a machine for working stone, the combination with a vibrating swinging carrier, and a plurality of disk-like tools rotatably mounted in the same plane thereon, and means to actuate said tool-carrier, to deliver a rapid succession of blows, with impacts in one and the same straight line, of a work-support, and means to move the same relatively to said tool-carrier, substantially as described.

13. In a stone-dressing machine, the combination with a cylinder and a piston reciprocated therein, of a pivoted tool-carrier, a tool freely rotatable therein, said tool having a smooth beveled edge, and connections between said piston and said carrier to vibrate the latter about its pivot, substantially as described.

14. In a machine for working stone, a work-support, a tool-carrier, and means to impart a relative feeding movement thereto, combined with a tool mounted upon said carrier and movable in an arc substantially tangential to the surface of the stone, and means rapidly to vibrate said carrier, to deliver a rapid succession of blows, each having its impact at said tangential point of meeting the surface, substantially as described.

15. In a machine for working stone, a work-support, a tool-carrier, a tool carried thereby, means to impart continuous feeding movement relatively to said support and carrier, and means to impart at the same time to the latter a rapid succession of short vibrations in the direction of said feeding movement, to deliver thereby a series of rapid blows approximately in the plane of the dressed surface of the stone, substantially as described.

In testimony whereof I have signed my name to this specification in the presence of two subscribing witnesses.

GEORGE L. BADGER.

Witnesses:
FREDERICK L. EMERY,
MARGARET A. DUNN.